Jan. 9, 1962 M. B. STULL 3,016,173
CLOSURE AND DISPENSING STRUCTURE
Filed March 2, 1956 2 Sheets-Sheet 1
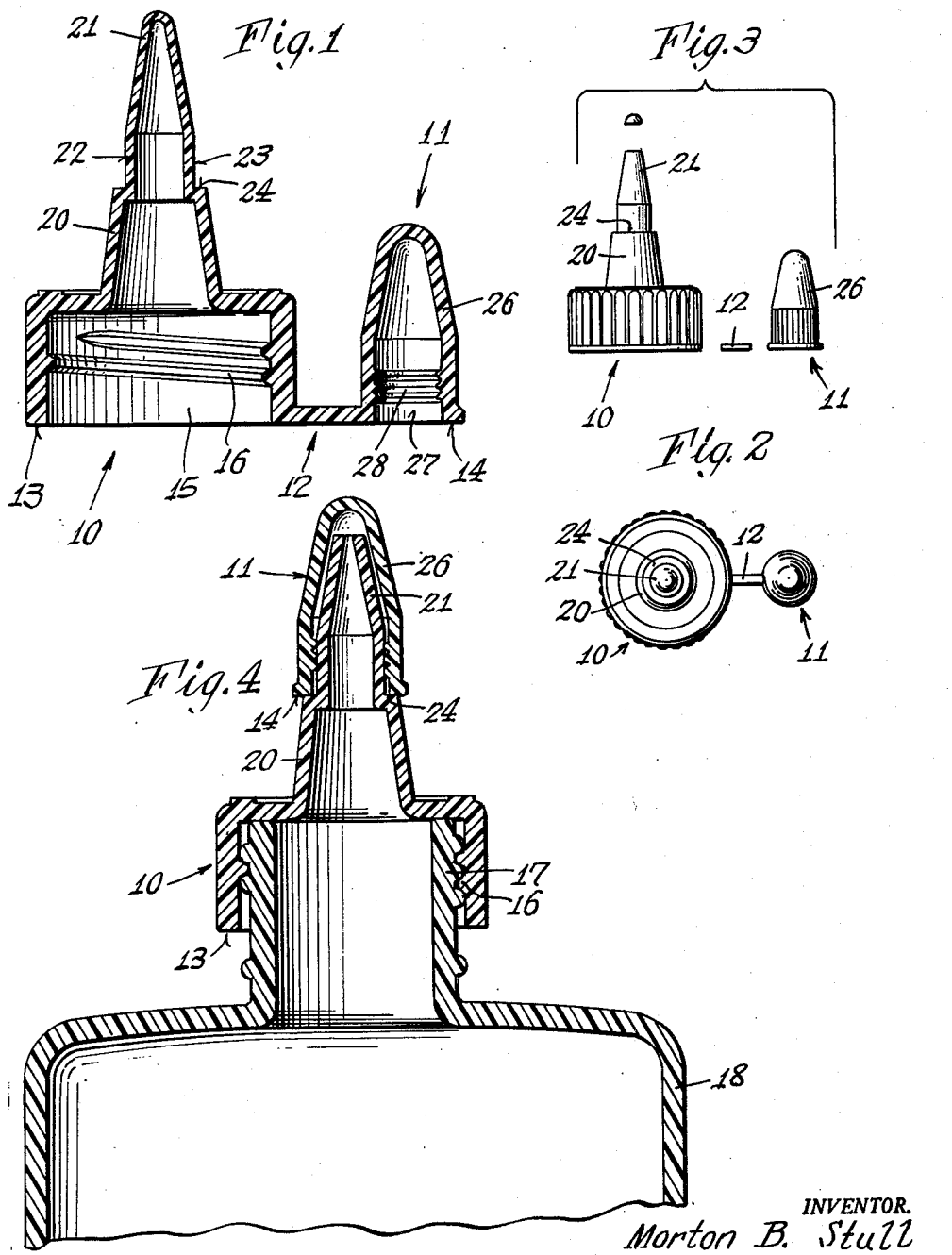
INVENTOR.
Morton B. Stull
BY
AGENT

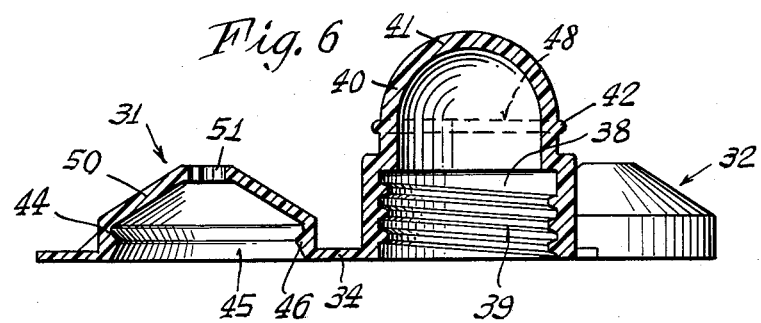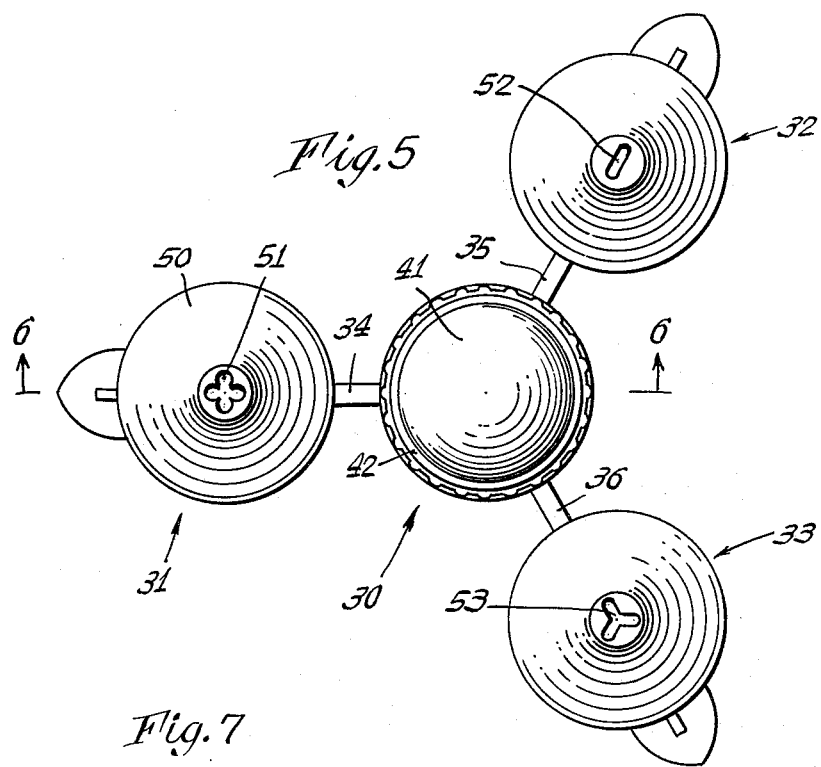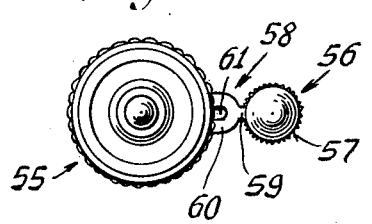

United States Patent Office
3,016,173
Patented Jan. 9, 1962

1

3,016,173
CLOSURE AND DISPENSING STRUCTURE
Morton B. Stull, Clifton, N.J.
(221–223 Banta Ave., Garfield, N.J.)
Filed Mar. 2, 1956, Ser. No. 569,169
3 Claims. (Cl. 222—541)

This invention relates to closure and dispensing caps or structures for use with small containers such as bottles and the like.

Heretofore it has been the practice, in providing dispensing caps and closures for bottles and the like, to furnish separate components, one constituting a screw-threaded closure cap for example, and another constituting a screw-threaded member substitutable for the cap and provided with a dispensing spout by which the contents of the bottle or container may be ejected in accordance with the requirements of use.

While this practice has in the main satisfactory, there have existed a number of drawbacks which, while always present have not always been readily apparent. For one thing, the provision of the separate components has necessitated a handling procedure which, while not unusual or unique, involved more time and a greater number of operations than would be required where but a single part or piece was being handled. Moreover, in the production or fabrication of the pieces separate molds or tools were required to produce the separate or individual parts, and this therefore involved a multiplicity of fabricating procedures.

Further, where multiple parts or components are concerned which have a cooperable relationship there is often present the problem of properly matching colors, and also of matching perfectly parts which come from different molds and different machines.

It is, of course, readily appreciated that, considering molded parts, the production of several or a multiplicity of components will involve a number of presses or at least a number of different molds, whereas if the components are reduced for example to one in number there would be involved only a single press and mold, and the entire production would also necessitate only the total press time represented by one press or piece of equipment. A further disadvantage which may often reside in the use of multiple parts or components, is the matter of assembly time. If such components are to be interfitted or correlated in any manner, this naturally will require time and effort, which must be paid for ultimately by the consumer, and in any event raises the cost proportionately.

If, as in the present instance, the components constitute dispensing and closure means, the problem of possible leakage is further aggravated where the dispensing cap is applied to the bottle and the closure component in turn applied to the cap, inasmuch as this results in two possible locations for leakage to occur.

The present invention overcomes the above drawbacks and disadvantages attendant the provision of multiple-component dispensing and closure members, and one object of the invention is to provide a dispensing cap construction and closure therefor which is extremely simple in construction and inexpensive to produce and handle.

Another object of the invention is to provide a novel and improved dispensing cap construction which comprises but a single, unitary, integral, molded-plastic piece characterized by a cap body portion normally imperforate and adapted to be perforated at a later time, and by a fitting portion spaced from the body portion and connected thereto by a web also adapted to be severed at a later time whereby the cap portion may be used for dispensing and the fitting portion may be thereafter applied to the cap portion to constitute a closure therefor.

In carrying out the above objects I provide a novel molded palstic structure which may be readily removed from simple die cavities and which may be produced in but a single press operaiton, the molding material being of the type enabling the parts to be readily severed by a cutting instrument such as an ordinary scissors, and enabling the closure cap portion to be also readily perforated by the same or a similar implement.

A still further object of the invention is to provide an improved dispensing and closure means wherein there is obviated the necessity for handling multiple parts intended to coact with each other, the necessity for matching colors of said parts, and the necessity for assembling the said parts.

Yet another object of the invention is to provide an improved dispensing and closure structure which may be economically produced by means of but a single press operation, thereby eliminating the necessity for utilizing several presses or pieces of equipment with the consequent doubling or tripling of molds or tools and press time.

Yet another object of the invention is to provide a novel and improved dispensing and closure means by which there is minimized the possibility of leakage of the contents of a container to which the said means is applied.

A feature of the invention resides in the provision of an improved dispensing and closure structure as above set forth wherein the economy that resides in the fabrication is not adversely reflected in the quality of the production, thereby providing ready acceptability from the standpoint of the purchaser and/or consumer.

Other features and advantages will hereinafter appear.

In the drawings accompanying this specification, similar characters of reference indicate corresponding parts wherever possible in the several views in which:

FIGURE 1 is an axial sectional view, enlarged, of an improved dispensing and closure structure made in accordance with the invention.

FIG. 2 is a top or plan view of the structure shown in FIG. 1.

FIG. 3 is a side elevational view of the structure after the cap body member has been perforated and after the closure member has been separated from the cap body member.

FIG. 4 is an axial sectional view of the dispensing and closure structure in assembled relation and applied to a container such as a bottle, which latter is shown in fragmentary vertical section.

FIG. 5 is a top or plan view of a dispensing and closure structure made in accordance with the invention and representing another embodiment thereof.

FIG. 6 is a sectional view taken on line 6—6 of FIG. 5.

FIG. 7 is a top view of a dispensing and closure structure, illustrating a modification of the invention.

Referring to FIGS. 1–4 the improved dispensing and closure structure of this invention comprises a single, unitary, integral, molded-plastic piece having a cap body portion indicated generally by the numeral 10 and a fitting portion indicated generally by the numeral 11. The fitting portion 11 is spaced from the body portion 10, as shown, and is attached thereto by a connecting strip or web 12 which is integral with both the cap body portion 10 and the fitting portion 11.

As shown in FIGS. 1 and 2, the body portion 10 has a circular lip 13 and the fitting portion 11 has a smaller circular rim 14, the said lip 13 and rim 14 being integral with the web 12 and all said elements lying in a single common plane transverse to the axis of the cap body portion 10.

Referring to FIG. 1, the body portion 10 has a bore 15 provided with internal screw threads 16, said bore being adapted to receive the threaded neck 17 of a container 18 whereby the threads 16 may engage the threaded neck 17 for securing the body portion to the container in sealing engagement therewith.

The body portion 10 has a projecting, hollow, dispensing structure 20 provided with a reduced closed tip 21, said structure also having, along part of its length, opposite exterior walls 22 and 23 which are substantially parallel with each other or non-divergent. Adjacent the exterior walls 22, 23 the projecting hollow structure 20 has an external annular shoulder 24.

The fitting portion 11 of the plastic piece comprises a tubular body 26 having a bore 27 provided with internal annular projecting means, for sealing purposes, which may be in the form of coaxial beads 28, said bore being adapted to receive at least a part of the said hollow dispensing structure 20, and in particular receiving the reduced tip 21 thereof and also the opposite, substantially-parallel side walls 22, 23. The beads 28 of the fitting portion 11 are effective as a sealing means, and said fitting portion is so constituted as to frictionally fit onto the projecting dispensing structure, and thereby to be frictionally retained thereon.

In accordance with the present invention, the plastic piece shown in FIGS. 1 and 2 is molded of such a yieldable plastic substance that the reduced tip 21 and the web 12 are flexible and capable of being readily severed by a cutting instrument, as for example an ordinary scissors. Such plastic material, for example, may be a suitable composition of polyethylene. Referring to FIG. 3 there is illustrated the plastic piece of FIGS. 1 and 2 after the tip 21 has been severed from the remainder of the dispensing structure, and after the web 12 has been severed from the cap body portion 10 and the fitting portion 11, as by the use of an ordinary scissors. After this has been carried out, the fitting portion 11 may be applied to the dispensing structure 20 of the cap body portion 10, as illustrated in FIG. 4, thereby to provide a closure for the cap body portion.

Prior to severance of the closed tip 21 and web 12, the plastic piece as shown in FIG. 1 may be utilized as a closure for the container 18 and supplied to the customer in this fashion, with the fitting portion 11 attached to the cap body portion 10 by means of the web 12. The body portion 10 may constitute a tight and leak-proof seal on the container 18, and when the ultimate consumer desires to use or dispense the contents of the bottle he need merely carry out the simple operation of cutting off the tip 21. In order to subsequently close the dispensing orifice thus provided, the user severs the fitting portion 11 from the cap body portion by cutting through the web 12, whereupon he may apply the fitting portion as shown in FIG. 4.

Another embodiment of the invention is illustrated in FIGS. 5 and 6, wherein there is shown a single, unitary, integral, molded-plastic piece having a cap body portion indicated generally by the numeral 30, and having a plurality of fitting portions indicated generally by the numerals 31, 32 and 33, said fitting portions being attached to the cap body portion 30 by webs 34, 35 and 36 respectively. The webs 34–36 are integral with the cap body portion 30 and with the fitting portions 31–33, as clearly shown in FIG. 6. The cap body portion 30 has a bore 38 provided with internal screw threads 39 adapting it for attachment to the threaded neck of a container, such as the bottle 18. The body portion 30 also has a projecting hollow dispensing structure 40 provided with a reduced closed tip 41 and further provided with an annular external bead 42 for a purpose to be shortly described.

Each of the fitting portions 31, 32 and 33 may comprise a tubular body 44 having a bore 45 adapted to receive at least a part of the projecting dispensing structure 40 and to frictionally fit therewith whereby the fitting portion may be frictionally retained on the dispensing structure. Referring to FIG. 6, the fitting portion 44 may have an internal annular bead 46 adapted to cooperate with the annular bead 42 and to slip over the same when the fitting portion is applied to the cap body portion 30. Such application is made possible by severing the bulbous portion of the dispensing structure from the remainder thereof, as by cutting through the structure along the line 48 or close to said line by means of a scissors or other sharp cutting implement. In FIG. 6 the fitting portion 31 is shown as having a truncated conical wall 50 terminating in a dispensing orifice 51 which is provided with an ornamental outline or configuration, shown herein as in the form of a four-leafed clover. The fitting portion 32 has a lozenge-shaped dispensing orifice 52, and the fitting portion 33 has a dispensing orifice 53 constituted of three elongate slots meeting at a center point and extending 120 degrees apart.

It will be understood that the dispensing and closure structure illustrated in FIGS. 5 and 6 may be applied to the container exactly as shown, to seal the contents of the container, and the ultimate consumer when he desires to use the contents will sever the dome-shaped portion 41 and apply either of the dispensing fittings 31, 32 or 33 by cutting through the appropriate web connecting it to the cap body portion 30.

By virtue of the structure shown being molded of pliable or yieldable polyethylene or similar plastic, the cooperable beads 42 and 46 may be molded without resorting to movable mold parts, and the necessary yielding and stretching of the cap body 30 and fitting portion may take place when the latter is applied to the cap body after severance of the dome 41.

Referring to FIG. 7, there is shown a dispensing and closure structure comprising a single, unitary, integral molded plastic piece having a cap body portion 55 and a fitting portion 56, the latter having knurling 57 around its outer periphery and being devoid of any outer bead or lip at its mouth, such as the outer bead shown in FIGS. 1 and 3. Instead, the fitting portion 56 has merely a plain lip or annular rim surrounding its mouth.

In accordance with the invention there is provided a web 58 having a narrow or attenuated section 59 adapted to be cut through, and having a wider section 60 provided with an aperture 61. The portion 60 constitutes a tab which remains on the cap body portion 59, and by virtue of the aperture 61, the eye formed thereby may be used to hang the entire package or container on a hook, if this should be desired.

It will be appreciated from the above that I have provided a novel and improved dispensing and closure structure constituted originally of but a single mold piece as distinguished from a multiplicity of pieces or components such as was heretofore employed. The single molded piece may accordingly be produced in but one mold, thereby simplifying the tooling and reducing the mold costs. Moreover, there is now only but a single piece to be handled where previously it was necessary to handle two or more pieces. Thus there is a considerable saving in handling, shipping and counting costs. Inasmuch as each of the pieces is formed in its entirety by a single operation, the coloring of the various portions thereof will be uniform even though variations in coloring are encountered from the beginning to the end of a run. Accordingly there is saved time, effort and money which was previously spent in matching colors of separate components.

By virtue of the dispensing and closure structure constituting but a single molded plastic piece, there is a saving of press time since only one piece of equipment is required to produce the desired production, as distinguished from multiple presses having different molds, or a single press provided with different molds at different times, to make multiple runs. Inasmuch as the dispensing and closure structure is assembled by the ultimate consumer there is no assembly cost to the fabricator, and consequently there is a saving in assembly that heretofore had to be included in the cost of the production.

It will be apparent that I have effected the above advantages without sacrificing the quality of the article, since the advantages are accomplished by molding components as a single piece instead of separate pieces. Accordingly, the acceptability to the consumer is not impaired but instead there is an increased eye appeal, since the impression is had that two or more caps are being provided at no increase or at little increase in cost.

Variations and modifications may be made within the scope of the claims, and portions of the improvements may be used without others.

I claim:

1. As a new article of manufacture, a dispensing cap construction comprising a unitary, integral, molded-plastic piece having a cap body portion and a plurality of fitting portions spaced from and disposed in equispaced relation to each other about said body portion, said piece having connecting webs attached to and integral with said portions, said cap body portion having an internally-threaded bore for receiving the threaded neck of a container whereby the body portion may be secured thereover, said body portion having a projecting, hollow, squat dispensing structure provided with a reduced, closed tip, said fitting portions each comprising a squat, tubular body having a discharge orifice of different configuration from the others and having a bore adapted to receive at least a part of the said dispensing structure to frictionally fit thereto whereby the fitting portion may be frictionally retained on the dispensing structure, the plastic material of the said webs and reduced tip being flexible and readily severable by a cutting instrument, thereby to enable any of the fitting portions to be separated from the cap body portion and to enable the closed tip of the dispensing structure to be separated from the remainder thereof to thereby provide an open dispensing passage in the body portion, any of said fitting portions when applied to and frictionally retained by the dispensing structure being adapted to constitute an orifice for the said passage.

2. A new article of manufacture comprising a dispensing cap construction for attachment to a container, said cap construction being constituted of a unitary, integral, molded plastic piece having a cap body portion and a stopper portion spaced from said body portion, said piece having a connecting web means by which the stopper and body portions are secured to each other, said web means comprising a plurality of relatively thin coextensive strips integral with said piece, said cap body portion having a bore for receiving the neck of the container whereby the body portion may be secured thereover, said body portion having a projecting, hollow, dispensing structure provided with a reduced tip, said stopper portion comprising a tubular body having a bore adapted to receive at least a part of the said dispensing structure and to frictionally fit thereto whereby the stopper portion may be frictionally retained on the dispensing structure, said web means being flexible and constituting part of a closed loop, said piece further having hanger means connected with one end of said web means and constituting part of a loop, for engagement with a support to effect a suspension of the cap body, said cap body portion and stopper portion having rims which are coplanar with each other and with the web means when the piece is molded.

3. A new article of manufacture comprising a dispensing cap construction for attachment to a container, said cap construction being constituted of a unitary, integral, molded plastic piece having a cap body portion and a stopper portion spaced from said body portion, said piece having a connecting web means comprising two thin and slender, coextensive spaced strips and a connecting yoke joining said strips, said web means being integral with said piece and normally joining the said portions together against incidental separation, said cap body portion having a bore for receiving the neck of a container whereby the body portion may be secured thereover, and having a projecting, hollow dispensing structure provided with a reduced tip, said stopper portion comprising a tubular body having a bore adapted to receive at least a part of said dispensing structure and to frictionally fit thereto whereby the stopper portion may be frictionally retained on the dispensing structure, said web means being flexible and readily severable by a cutting instrument, thereby to enable the stopper portion to be separated from the cap body portion for placement on the dispensing structure, said spaced strips and connecting yoke comprising a hanger constituting part of an eye by which the cap body portion and container attached thereto may be suspended from a support passing through said eye, said cap body portion and stopper portion having rims which are coplanar with each other and with the web means when the piece is molded.

References Cited in the file of this patent

UNITED STATES PATENTS

| 1,256,345 | Marceau | Feb. 12, 1918 |
| 2,168,822 | Fink | Aug. 8, 1939 |
| 2,365,524 | Court | Dec. 19, 1944 |
| 2,757,824 | Savary | Aug. 7, 1956 |
| 2,761,598 | Darlington | Sept. 4, 1956 |

FOREIGN PATENTS

| 1,106,597 | France | July 20, 1955 |